RADIO TRANSMITTER TUNER

Filed Nov. 25, 1953 2 Sheets-Sheet 1

INVENTOR.
WILLIAM H. EPPERSON

BY Campbell, Brumbaugh, Free & Graves
his ATTORNEYS

RADIO TRANSMITTER TUNER

Filed Nov. 25, 1953 2 Sheets-Sheet 2

INVENTOR.
WILLIAM H. EPPERSON

BY
Campbell, Brumbaugh, Free & Graves
his ATTORNEYS

United States Patent Office 2,824,220
Patented Feb. 18, 1958

2,824,220

RADIO TRANSMITTER TUNER

William H. Epperson, Coral Gables, Fla., assignor to Aeronautical Communications Equipment, Inc., Miami, Fla., a corporation of Florida Application November 25, 1953, Serial No. 394,331

9 Claims. (Cl. 250—17)

This invention relates to the tuning of radio transmitters and has particular reference to methods and apparatus for automatically tuning a radio transmitter to a selected carrier frequency.

A particularly difficult problem encountered in multi-channeled radio transmitters is the adjustment of the tuned stages after the selection of a desired frequency. In the past, such tuning has been accomplished in various ways ranging from simple hand adjustment of the tuned circuits to involved circuits including a plurality of motors adjusting variable elements in the transmitters. However, all of these systems have suffered from defects such as an undesirable time interval necessary to tune a manually operable system and the inaccurate and unreliable operation afforded by some of the more involved tuning arrangements.

In accordance with the present invention, the above-mentioned defects of the prior transmitter tuners has been overcome and reliable, accurate tuning of a transmitter to a desired one of a plurality of channels may be simply accomplished. The operation of the tuner is automatically initiated upon the selection of a predetermined carrier frequency which places the appropriate crystal in circuit with the transmitter oscillator. A definite sequence of events follows such selection, the first being a search for a band of frequencies within which the selected frequency lies. Information gained from the current flow in one stage of the transmitter is employed to indicate the proper band and subsequently, a further search is initiated within the band for various values of such current flow in order to provide for exact tuning of the tuned stages in the transmitter. In the event the correct value of current is not found during either of the searchers, the tuner is automatically deenergized.

These and further advantages of the invention will be more readily understood when the following description is read in connection with the accompanying drawings in which.

Figure 1:
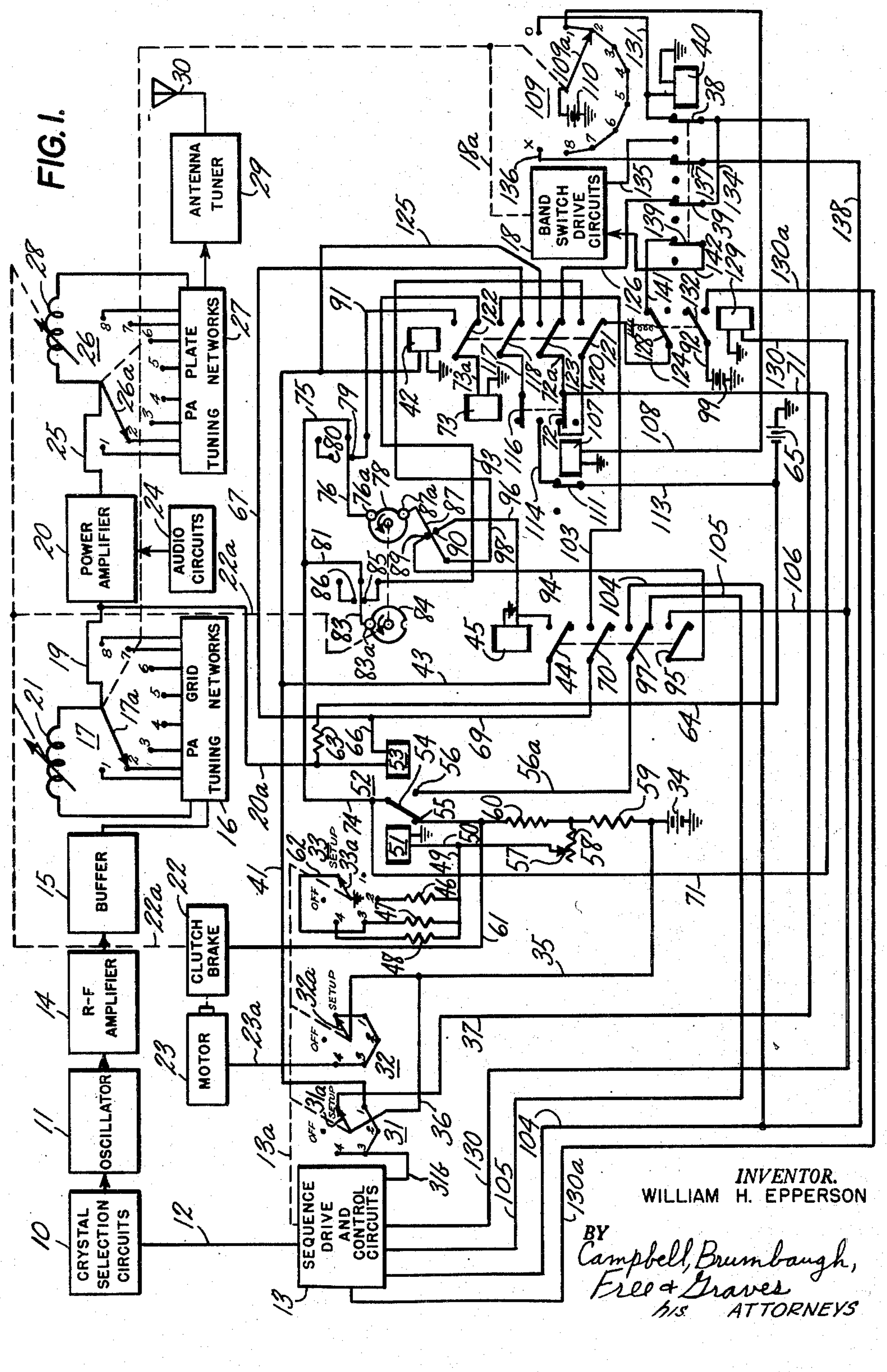
Figure 1 is a schematic circuit diagram partially in block form of a transmitter tuner in accordance with the present invention.

Referring to the drawings in more detail with particular reference to Fig. 1, the crystal selection circuits 10 may comprise any conventional arrangement for inserting a desired one of a plurality of crystals in a circuit determining the frequency of an oscillator 11. For example, a rotatable drum having crystals mounted thereon may be employed in cooperation with appropriate control circuits. During the interval the selected crystal is being inserted into the oscillator circuit 11, a conductor 12 leading to sequence drive and control circuits 13, described in detail hereinafter, is energized in order to initiate the action of the circuits 13.

Signals from the oscillator 11 are coupled through an R.-F. amplifier 14 and an isolating buffer stage 15 to power amplifier grid tuning networks 16, such networks comprising any conventional L-C or R-C arrangements desirable for the frequencies employed. A conventional band switch 17 including a switch arm **17*a* is mechanically driven from band switch drive circuit 18 through a mechanical linkage 18*a* The arm 17*a* selectively joins the tuning networks 16 through the switch contacts 1 to 8, inclusive, and a conductor 19 to the grid circuits of a power amplifier 20**.

Connected across the power amplifier grid tuning networks 16 is a variable inductance 21, preferably comprising a variometer. As is well known, variometers may be formed from two concentrically mounted coils and the inductance thereof varied by providing for relative movement between such coils. The variable inductance 21 is mechanically coupled by a conventional linkage **22*a* to a clutch brake 22 driven by a motor 23, selectively energized as will be explained below. The clutch brake 22 is of a well known construction which, when energized, transmits rotary motion from the motor 23 to an element of the inductance 21** and which, when deenergized, acts as a brake to immediately stop such rotating elements.

Audio circuits 24 are coupled to the power amplifier 20 to provide the necessary modulation for the carrier signals therein.

A conductor 25 joins the plate circuit of the power amplifier 20 to a switch arm **26*a* carried by a band switch 26, the arm 26*a* being mechanically coupled by the linkage 18*a* to the band switch drive circuits 18 for selectively inserting one of a plurality of power amplifier plate tuning networks 27 in the plate circuit of the power amplifier 20. It will be noted that the band switch 26 also carries contacts 1 to 8, inclusive, these contacts as well as those found on the switch 17** corresponding to eight bands through which the transmitter may be tuned. It is apparent that any desired number of bands may be provided, the number shown being exemplary only.

Also connected to the arm **26*a* is a variable inductance 28 joined at its other end to the plate tuning networks 27, and preferably comprising a variometer as described in connection with the variable inductance 21. The movable element of the inductance 28 is also mechanically joined to the clutch brake 22 by the linkage 22*a***.

The modulated carrier is coupled to an antenna 30 from the selected plate tuning network in the tuning networks 27 through an antenna tuner 29, designed to match the impedance of the antenna 30 to the output impedance of the power amplifier 20.

The above description has been of the transmitter circuits employed to generate and modulate a carrier of a desired frequency for radiation from an antenna 30. The following description will concern itself with the automatic control circuits employed to tune the grid and plate circuits of the power amplifier 20 to the exact carrier frequency selected by the crystal selection circuits 10.

During the insertion of a desired crystal in circuit with the oscillator 11, the conductor 12 is energized causing the sequence drive and control circuits 13 to initiate the automatic tuning operation by driving, through a mechanical linkage **13*a*, movable switch arms 31*a*, 32*a* and 33*a* carried by sequence switches 31, 32 and 33**, respectively.

Examining the switch 31 in detail, six positions are afforded the arm **31*a*, as well as the arms 32*a* and 33*a*, these positions being Off, Setup, 1, 2, 3 and 4. In its Off position, the arm 31*a* rests on a blank contact while in the Setup position, the meaning of which will be fully explained below, a source of potential 34 is connected through conductors 35 and 36, the arm 31*a*** and conductors 37 and 134 to two armatures 38 and 39 of a conventional relay 40. The arm 31*a*, when engaging the electrically interconnected contacts 1, 2, 3 or 4 of the switch 31, energizes both a conductor 31*b* leading to the circuits 13 and a relay 42 through a conductor 41. A conductor 43 is tied to the conductor 41 and leads to an armature 44 of another relay 45.

Turning next to the connections afforded the switch 32, the arm 32*a* is joined by the conductor 35 to the source of potential 34 and when in the Off position, is on a blank contact. As the arm 32*a* is rotated to the Setup position, the positive potential on the arm 32*a* energizes the motor 23 through a conductor 23*a*. It should be noted that the Setup and 1, 2, 3 and 4 contacts of the switch 32 are electrically joined so that throughout the tuning sequence, the motor 23 is energized.

The grounded switch arm 33*a* is selectively joined through a series of resistances to the source 34 upon rotation thereof. The Off and No. 1 contacts of the switch 33 are blank, the Setup and No. 3 contacts are joined by a conductor 62, while the contacts 2, 3 and 4 are connected by resistors 46, 47 and 48, respectively, to a conductor 49 which is tied to a conductor 50 joined at one end to the bias winding 51 of a differential relay 52. A control winding 53 and an armature 54 swinging between contacts 55 and 56 complete the differential relay assembly.

At its other extremity, the conductor 50 leads to a tap 57 on a resistor 58 joined to the juncture point of two resistors 59 and 60. The other end of the resistor 59 is tied to the source 34 and the resistor 60 is joined to the contact 55 and a conductor 61 leading to the clutch brake 22. The front contact 56 of the relay 52 is joined by a conductor 56a to an armature 97 of the relay 45.

The control winding 53 of the differential relay 52 has one terminal tied to a conductor 20*a* leading to the grid circuits of the power amplifier 20 through the conductor 19. Also joined to the conductor 20*a* is a resistor 63 coupled by a conductor 64 to a negative bias source 65 for the grids of the power amplifier, the positive side of the source 65 being grounded. The other terminal of the winding 53 is joined through conductors 66 and 67 to a back contact of the relay 42. The conductor 66 also is intercepted by a conductor 69 tied to an armature 70 of the relay 45.

The armature 54 of the differential relay 52 is joined by a conductor 71 to an armature 72 of a relay 73 and is also connected by conductors 74 and 75 to a switch arm 76 having a cam follower 76*a* affixed to one end thereof and resting on a cam 78 rotating as indicated by the arrow thereon. The switch arm 76 is moved between contacts 79 and 80 upon rotation of the cam 78, such rotation being supplied through the mechanical linkage 22*a* leading to the clutch brake 22. The cam 78 has such a configuration and is so oriented with respect to the variable inductances 21 and 28 by the linkage 22*a* that the arm 76 is disengaged from the contact 79 as the inductances 21 and 28 are passing through their maximum values and the arm 76 again engages the contact 79 as the inductances are passing through their minimum value.

Also joined to the armature 54 through the conductor 74 and a conductor 81 is a switch arm 83 having a cam follower 83*a* attached to one end thereof. The follower 83*a* rests on a rotating cam 84 which actuates the arm 83 between contacts 85 and 86 and is driven in synchronism with the cam 78 by the mechanical linkage 22*a* from the clutch brake 22. The variable inductances 21 and 28 are so oriented by the linkage 22*a* with respect to the cam 84 that the arm 83 engages the contact 85 when the inductances 21 and 28 are passing through their maximum and minimum values.

Completing the description of the switches associated with the cam 78, the contact 79 is joined by a conductor 91 to a front contact of the relay 42 while the contact 80 leads to a blank terminal. A second switch arm 87 having a cam follower 87*a* affixed thereto, is joined by a conductor 98 to a front contact of the relay 42 and is actuated by the cam 78 between switch contacts 89 and 90 joined, respectively, by a conductor 94 to an armature 95 of the relay 45, and by a conductor 96 to one terminal of the relay 45 and to a front contact thereof.

Armatures 44, 70, 97 and 95 are simultaneously actuated by the relay 45 between a like number of pairs of contacts. A conductor 103 leads from a front contact of the relay 45 to a front contact of the relay 42 while conductors 104 and 105 lead from related front and back contacts of the relay 45 to the sequence drive and control circuits 13. Still another front contact is joined to the circuits 13 through conductors 106 and 130.

Turning next to a band switch 109, a source of potential is joined to a switch arm 109*a* driven by the mechanical linkage 18*a* to contacts 0, 1 to 8, inclusive, and X. The contacts 0 and X are joined by conductors 131 and 136 to two front contacts of the relay 40, while the interconnected contacts 1 to 8 are joined by a conductor 108 to one terminl of a relay 107 actuating an armature 111.

Examining the circuit connections afforded the relays 107 and 73, a conductor 113 joins the armature 111 to the source 65 while a front contact of the relay 107 is tied by a conductor 114 to a back contact of the relay 73. One terminal of the relay 73 is joined to an armature 122 of the relay 42 by a conductor 73*a*, armatures 72 and 116 being actuated thereby and respectively connected by a conductor 72*a* to the armature 123 and by a conductor 117 to an armature 118. A front contact of the relay 73 is joined by a conductor 120 to an armature 121 of the relay 42.

The armatures 122, 118, 123 and 121 of the relay 42 are simultaneously actuated, as are the armatures of the other described relays, and are shown mechanically interconnected to indicate such simultaneous movement. Completing the description of the relay 42, a front contact is joined by a conductor 125 and the conductor 41 to the contacts 1, 2, 3 and 4 of the selector switch 31 while the related back contact is joined by a conductor 126 to a front contact of the relay 40. A back contact of the relay 42 is joined by a conductor 124 to an armature 128 of a relay 129.

Examining the relay 129, one terminal thereof is joined to the sequence drive and control circuits 13 through a conductor 130. A second armature 132 is tied by a conductor 92 to a source of potential 99 which may be applied through a front contact of the relay 129 through a conductor 130*a* to the circuits 13. A back contact of the relay 129 is joined by a conductor 141 to a front contact of the relay 40.

Completing the description of the relay 40, a back contact thereof is joined by a conductor 135 to the band switch drive circuits 18 while an armature 137 is connected through conductors 138 and 104 to the sequence drive and control circuits 13. Still another armature 139 is joined by a conductor 142 to the circuits 18.

Figure 3:
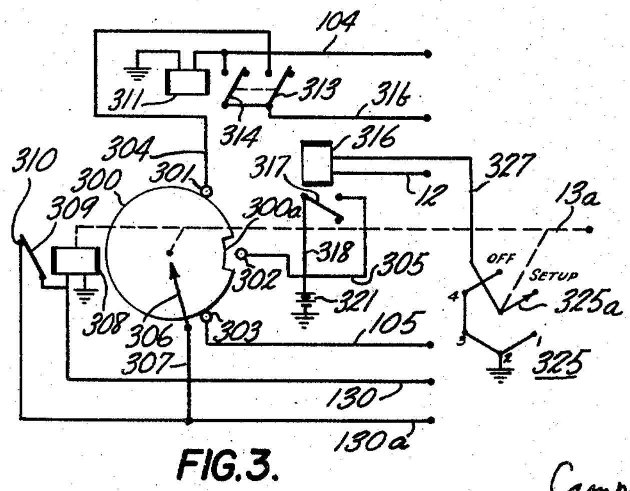
Figure 3 is a schematic diagram of the sequence drive and control circuits illustrated in Fig. 1.

Examining the sequence drive and control circuits 13 in detail with particular reference to Fig. 3, a sequence switch conductive wafer 300, formed with a notch 300*a* therein, selectively engages contacts 301, 302 and 303 joined to the conductors 304, 305 and the conductor 105, respectively. Another contact 306, continuously engaging the wafer 300, is joined by a conductor 307 to the conductor 130*a* leading to one terminal of a stepping solenoid 308 through a contact 310, an armature 309 and the conductor 130. The solenoid 308 may take the form of a rotary solenoid and rotates the wafer 300 in steps in response to energization thereof. For simplicity, such stepping is represented on these drawings by the connection of the mechanical linkage 13*a* to the solenoid 308, the wafer 300 and the switch arms 31*a*, 32*a*, 33*a* and 325*a*.

Also provided in the circuits 13 is a relay 311 having one terminal energized by the conductor 104, this conductor also being joined to a front contact of the relay 311. Armatures 313 and 314 of the relay 311 are electrically interconnected and joined to the conductor 31*b* while another front contact of the relay 311 is tied to the contact 301 through the conductor 304.

The conductor 12 leads to one terminal of another relay 316 in the circuits 13, the other terminal being joined to a conductor 327. An armature 317 of the relay 316 is energized through a conductor 318 by a source of potential 321 while a front contact thereof is connected to the conductor 305.

A sequence switch 325, carrying a rotating arm 325*a* tied to the conductor 327 and actuated by the mechanical linkage 13*a* from the solenoid 308, includes grounded contacts 1 to 4 and Off, and a blank Setup contact.

Figure 4:
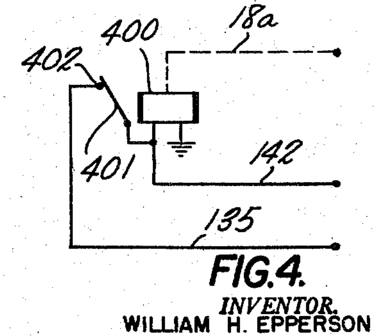
Figure 4 is a schematic diagram of the band switch drive circuits shown in Fig. 1.

In the band switch drive circuits 18 shown in detail in Fig. 4, a band solenoid 400, which may be a rotary solenoid, is provided with a mechanical connection 18*a* extending therefrom to step the band switch arms 17*a*, 26*a* and 109*a*. One terminal of the relay 400 is grounded while the other terminal is connected to the conductor 142 and to the armature 401, which engages a contact 402 when the solenoid is deenergized, the conductor 135 being tied to the contact 402.

In describing a typical operation of the embodiment of the invention illustrated in Figs. 1, 3 and 4, reference will be made to the sequence diagram of Fig. 2 to aid in explaining the sequence of operations followed in automatically tuning the transmitter.

*Frequency selection*

In any conventional manner, a desired crystal in the crystal selection circuits 10 is inserted in the oscillator 11 and during such insertion, the conductor 12 is energized which results in the energization of the relay 316 (Fig. 3) through the conductor 327, and the switch arm 325*a* which is grounded at its Off position. As a result, the potential of the source 321 is applied through the conductor 318, the armature 317, the conductor 305 to the contact 302 and the conductive wafer 300 resulting in the energization of the solenoid 308 through the contact 306, the conductors 307 and 130*a*, the contact 310, the armature 309 and the conductor 130. Accordingly, the conductive wafer 300, as well as the sequence switch arms 325*a*, 31*a*, 32*a* and 33*a*, are stepped by the linkage 13*a* until the notch 300*a* disengages the contact 302 from the wafer 300 and at this point, the sequence switch arms will be positioned on their Setup contacts. Accordingly, the relay 316 will be deenergized and the transmitter tuner will be in condition to commence preliminary tuning as soon as the insertion of a crystal in the circuits of oscillator 11 is completed. This is indicated in Fig. 2 by the arrows leading from the New Frequency Selected box through the Off and Setup positions of the Sequence Switch and the Frequency Selection Completed box to Preliminary Tuning.

*Preliminary tuning*

Upon the rotation of the arms 31*a*, 32*a* and 33*a* to the Setup position, the motor 23 is energized from the source 34 through the conductor 35, the arm 32*a* and the conductor 23*a*. At the same time, the solenoid 400 in the band switch circuits 18 (Fig. 4) is energized from the source 34 through the conductors 35 and 36, the switch arm 31*a*, the conductor 37, the armature 38, the conductor 135 and the armature 401 causing the arm 109*a* of the switch 109 to step to the 0 position. This action results in the energization of the relay 40 from the source 110 through the arm 109*a* and the conductor 131, and the actuation of the armature 38 interrupts the circuit to the solenoid 400 so that rotation of the switch arm 109*a* is halted. A holding circuit is provided for the relay 40 from the source 34 through the conductors 35 and 36, the switch arm 31*a*, the conductor 37 and the armature 38.

With the switch arm 109*a* on the contact 0 and the relay 40 energized, the source 110 energizes the armature 54 of the differential relay 52 through the arm 109*a*, the contact 0, the conductor 131, the armature 38, the conductor 134, the armature 39, the conductor 126, a back contact of the relay 42, the armature 123, the conductor 72*a*, and the conductor 71. Since the armature 54 normally engages the contact 55, the clutch brake 22 is energized through the conductor 61 and couples the rotation of the motor 23 through the linkage 22*a* to the tuning elements in the variable inductances 21 and 28.

The control winding 53 is energized in response to voltage generated across the resistor 63 by the power amplifier grid current flowing in circuit with the bias source 65, such voltage being directly applied across the control winding 53 by the energization of the necessary relays. Thus, when a predetermined value of grid current flows, the control winding 53 will actuate the armature 54, as will be more fully detailed hereinafter.

It should be noted that the energizing circuit for the control winding 53 of the differential relay 52 is completed through the contacts of the relay 45, the relay 42, the relay 73 and the relay 107, preventing actuation of the armature 54 except during the proper times in the tuning sequence. It is evident that at this point in the sequence, the relay 107 is deenergized and the circuit to the control winding 53 of the differential relay is open.

Continuing with the preliminary tuning, the rotation of the movable elements in the inductances 21 and 28 causes the cams 78 and 84 to rotate and in the event a variometer is used for the elements 21 and 28, the cams are connected thereto with a 1 to 1 rotation ratio. The first time following the energization of the clutch brake 22 that the cam follower 83*a* drops into a slot on the cam 84, the positive potential which has previously energized the armature 54 will be further applied through the conductors 74 and 81, the arm 83, the contact 85, the conductor 93, the armature 122 and the conductor 73*a* to energize the relay 73. In response to the energization of the relay 73, the stepping solenoid 400 in the band switch drive circuits 18 is energized from the positive potential applied to the armature 54 through the conductor 71, the armature 72 of the relay 73, the conductor 120, the armature 121, the conductor 124, the armature 128, the conductor 141, the armature 139 and the conductor 142. Accordingly, the solenoid 400 rotates the switch arms 17*a*, 26*a* and 109*a* to contact No. 1, placing the band 1 networks in the grid and plate circuits of the power amplifier 20.

Now that the tuning system has placed the transmitter on band 1, a determination must be made as to whether the crystal frequency selected by the circuits 10 lies within this band, a tuning which might be referred to not only as a preliminary tuning but as a broad tuning for a predetermined amount of power amplifier grid current.

Figure 2:
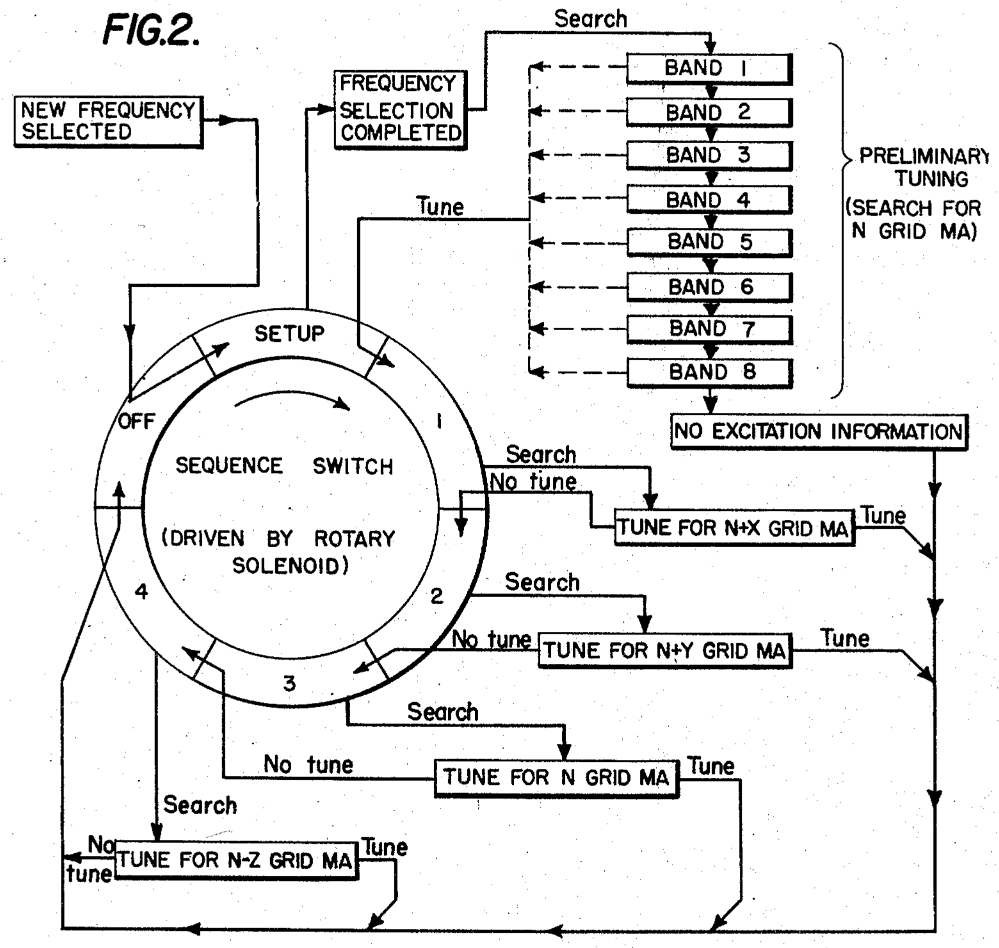
Figure 2 is a sequence diagram of the various operations performed by the apparatus shown in Fig. 1.

With the arm 109*a* at the No. 1 contact, the relay 107 is energized from the source 110 through the arm 109*a* and the conductor 108 placing the differential relay 52 in condition to respond to a predetermined value of power amplifier grid current N as shown in Fig. 2.

The grid current necessary to operate the differential relay 52 is determined by the amount of bias current fed through the bias winding 51, and this in turn is determined by the resistors 46, 47 and 48 and the position of the slider 57 on the resistor 58. In the Setup position, current flow to the winding 51 is determined by the resistor 58 and the resistor 47, it being obvious that inclusion of the resistor 47 in the circuit presents a parallel path to ground thus lowering the voltage across the relay winding 51 and causing a smaller current to flow therethrough.

The slider 57 may be considered a master control which when set at a predetermined position determines the amount of bias current for each of the sequence positions, As the switch arm 33a continues around to contacts 1, 2, 3 and 4, it is evident that in the No. 1 position, the greatest amount of bias current will flow through the relay winding 51 while the insertion of the resistors 46, 47 and 48, each having a smaller value of resistance, will cause the bias current to sequentially decrease in predetermined steps.

In the Setup position, the preliminary search is for the grid current N as indicated in Fig. 2 and is first made in band 1. Since the relay 52 is in an operative condition as set forth above, there are three possibilities presented. First, power amplifier grid current may not occur at all if R.–F. energy is not being received by the power amplifier 20 due to, for example, the lack of a crystal in the oscillator 11. In this event, the band switch drive circuits 18 will rotate the arms 17a, 26a and 109a to the next position each time the cam follower 83a drops into one of the slots on the cam 84, until all of the 8 bands have been searched for excitation information and if none is found, the arm 109a will rotate to the contact X and shut off the system as shown in Fig. 2, and which will be more fully explained hereinafter.

The second possibility is that grid current will occur, near the end of the band, that is not equal to or greater than N. In this instance, when the follower 83a falls into the next slot on the cam 84, the solenoid 400 will drive each of the switch arms 17a, 26a and 109a to position 2, the position shown on the drawing, and a search for the required value of grid current in this band will be initiated by the rotation of the movable elements in the variable inductances 21 and 28 from maximum to minimum or from minimum to maximum values, depending upon the position of the inductance elements when the arm 83 engaged the contact 85. Assuming that a value of grid current N occurs during the preliminary search through the band 2, the third of the aforementioned possibilities, the armature 54 will swing to the contact 56 and a new series of events will occur.

Before discussing these subsequent events, it might be well to explain the operation of a unique circuit for providing positive operation of the differential relay 52. It will be understood that with a conventional differential relay, it would be possible for the armature 54 to start towards the contact 56 and hesitate due to a sudden drop in the grid current. However, as soon as the armature 54 leaves the contact 55 with the circuit arrangement shown, the current flow from the armature 54 through the resistors 60 and 58, the tap 57 and the bias winding 51, is interrupted which reduces the bias current and results in positive operation of the armature 54.

Upon the armature 54 being disengaged from the contact 55, the clutch brake is deenergized and the movable elements in the variable inductances 21 and 28 are almost instantaneously stopped. The potential from the armature 54 is subsequently applied to the contact 56 resulting in the energization of the stepping solenoid 308 (Fig. 3) through the conductor 56a, the armature 97, the conductor 105, the contact 303, the wafer 300, the contact 306, the conductors 307 and 130a, the armature 309 and the conductor 130, causing the arms 325a, 31a, 32a and 33a to rotate to the No. 1 contact of the final tune position which encompasses the sequence switch contacts 1, 2, 3 and 4.

The relay 129 is energized simultaneously with the solenoid 308 resulting in the actuation of the armature 128. Thus, the circuit to the band switch drive circuits 18 is interrupted to prevent stepping of the band switches during actuation of the sequence drive and control circuits 13. Further, the source 99 is applied to the solenoid 308 through the conductor 92, the armature 132, the conductor 130a, the armature 309 and the conductor 130 to aid in the operation of these circuits.

Referring to the sequence diagram shown in Fig. 2, it can be seen the sequence of operations has now progressed from the preliminary tuning, which is a search for a value of grid current N, to the No. 1 position of the sequence switch through the Tune arrow. As indicated above, if the required value of grid current was not found in any of the bands 1 to 8, the system would be turned off as indicated by the arrows leading from the No Excitation Information box to the Off position on the sequence switch.

*Final tuning*

As the stepping solenoid 300 rotates the arms 31a, 32a and 33a to position 1 for final tuning, several new conditions are set up in the transmitter tuner. The relay 40 is deenergized as the relay 42 is energized from the source 34 through the conductors 35 and 36, the arm 31a and the conductor 41 and at the same time, the shunt resistor 47 is removed from the bias control circuits of the relay winding 51 when the arm 33a is moved to the blank contact 1. Furthermore, upon the actuation of the armatures of the relay 42, a positive potential is applied from the source 34 to the armature 54 through the conductors 35 and 36, the switch arm 31a, the conductors 41 and 125, the armature 123, the conductor 72a and the conductor 71. Due to the application of this voltage to the contact 55, the clutch brake 22 will again be energized through the conductor 61, and the movable elements in the inductances 21 and 28, as well as the cams 78 and 84, will be rotated by the motor 23 through the linkage 22a.

During the final tuning, the variable inductances 21 and 28 will tune from maximum towards minimum inductance. Thus, the first time that the switch arm 76 engages the contact 79, the relay 73 is energized from the armature 54 through the conductors 74 and 75, the arm 76, the conductor 91, the armature 122, and the conductor 73a. Furthermore, upon the energization of the relay 73 and the further rotation of the cam 78 to cause the arm 87 to engage the contact 90, the relay 45 will also be energized from the voltage at the armature 54 through the conductor 71, the armature 72, the conductor 120, the armature 121, the conductor 98, the arm 87 and the conductor 96. It should be noted that the relay 45 holds itself closed through its own contacts by voltage from the source 34 through the conductors 35 and 36, the arm 31a, the conductors 41 and 43 and the armature 44 leading to the conductor 96.

It is apparent that during the aforementioned operations of the final tuning sequence, at least one of the relay actuated circuits through which the control winding 53 of the relay 52 is energized has been open to prevent premature operation of the armature 54. At this stage in the final tuning, the relay 73 is energized and interrupts the current path for the control winding 53. However, as soon as the switch arm 76 is disengaged from the contact 79 by the cam 80, which will occur at the maximum inductance of the tuning elements 21 and 28, the relay 73 will be deenergized, the winding 53 will be energized in accordance with the grid current and if it exceeds a value $N+X$, as indicated in Fig. 2, the armature 54 will be actuated.

Assuming that this search for the value of grid current $N+X$ is not successful, the switch arm 76 falls at the minimum inductance of the tuning elements 21 and 28 and engages the contact 79 causing the relay 73 to be energized, as explained heretofore. This results in the energization of the stepping relay 308 from the potential at the armature 54 through the conductor 71, the armature 72, the conductor 120, the armature 121, the conductor 98, the switch arm 87, the contact 89, the conductor 94, the armature 95, and the conductors 106 and 130, actuating the arms 31a, 32a, 33a and 325a to the No. 2 position in the final tuning sequence.

With the switch arms 31a, 32a and 33a on contacts 2 of their respective switches, a new condition is set up. The current through the bias winding 51 is reduced a predetermined amount by the insertion of the resistor 46 in circuit therewith so that a search is made, from the maximum to the minimum inductance of the elements 21 and 28 as above indicated, for a value of grid current $N+Y$ slightly smaller than the value $N+X$ searched for in the first final tuning position. Final tuning in the No. 2 position will be initiated in the same manner as in the above-described final tuning for the No. 1 position of the sequence switch.

Assuming that grid current equal to or greater than $N+Y$ is found in the No. 2 final tuning position, the armature 54 will swing to the contact 56 thereby deenergizing the clutch brake 22 which immediately halts the movable elements in the variable inductances 21 and 28. Such braking is so quickly accomplished that the tuning elements rotate only an exceedingly small distance past the point at which the maximum grid current was found and to all intents and purposes are stopped at such point.

As soon as the armature 54 engages the contact 56, the relay 311 (Fig. 3) is energized through the conductor **56*a*, the armature 97 and the conductor 104 resulting in the actuation of the armature 314 which establishes a holding circuit for the relay 311 as long as the conductor 31*b* is energized from the switch arm 31*a*. Further, the armature 313 applies the same voltage to the stepping solenoid 308 through the conductor 304, the contact 301, the wafer 300, the contact 306, the conductor 307, the conductor 130*a*, the armature 309 and the conductor 130, causing the sequence switch arms 31*a*, 32*a*, 33*a* and 325*a* to be stepped to their Off positions. Consequently, the conductor 31*b* and the motor 23** are deenergized and the tuning is completed.

As is evident from the sequence diagram of Fig. 2, there are four final tuning positions and if the value of grid current $N+Y$ was not found in the No. 2 position as described herein, a search would be made in the No. 3 position for a lower value of grid current by again reducing the bias current in the winding 51. If the requisite grid current is still not discovered, a still lower value of grid current $N-Z$, lower than the preliminary search current, is searched for. If such a value of grid current is not discovered, the tuner is stepped to its Off position.

Although methods and apparatus for tuning a power amplifier of a radio transmitter have been described, the invention is not limited to power amplifiers but may be employed in one or more other tuned stages in a transmitter. It is also obvious that if desirable, the plate current of a tuned stage could be employed instead of the grid current to indicate proper tuning thereof.

From the above description, it is evident that an automatic tuning system for a multi-channel transmitter has been provided that combines the advantages of rapid tuning with extremely accurate tuning due to the employment of both a preliminary tuning for a band of frequencies and a final tuning within the discovered band to complete the tuning to a high degree of accuracy. It will, of course, be understood that the above-described embodiment of the invention is illustrative only and modifications thereof will occur to those skilled in the art. For example, a greater or lesser number of bands can be utilized as well as a greater or lesser number of final tune positions. Furthermore, capacitive instead of inductive tuning elements may be employed. Therefore, the invention is not to be limited to the specific apparatus disclosed herein but is to be defined by the appended claims.

I claim:

1. Apparatus for tuning the power amplifier of a radio transmitter to a selected carrier frequency comprising a plurality of first networks adapted to broadly tune the grid circuit of said amplifier, a plurality of second networks adapted to broadly tune the plate circuit of said amplifier, a first tuning element coupled to the grid circuit of said amplifier, a second tuning element coupled to the plate circuit of said amplifier, first means including said first and second tuning elements responsive to grid current flowing in said amplifier for inserting one of said first networks in the grid circuit of said amplifier and one of said second networks in the plate circuit of said amplifier, and second means responsive to grid current flowing in said amplifier to adjust said first and second elements for further tuning said amplifier to the selected carrier frequency.

2. Apparatus as defined in claim 1 wherein said tuning elements are adjusted from a maximum to a minimum value in further tuning said amplifier.

3. Apparatus as defined in claim 2 wherein said tuning elements consist of variometers.

4. Apparatus for tuning the power amplifier of a multi-channel radio transmitter to a predetermined channel comprising a plurality of first networks adapted to broadly tune the grid circuit of the power amplifier when inserted therein, a first tuning element in the grid circuit of said amplifier, a plurality of second networks adapted to broadly tune the plate circuit of said amplifier when inserted therein, a second tuning element in the plate circuit of said amplifier, first means including said first and second tuning elements responsive to a first predetermined value of grid current for inserting one of said first networks in the grid circuit of said amplifier and one of said second networks in the plate circuit of said amplifier for broadly tuning said amplifier to said predetermined channel, second means responsive to a plurality of sequentially decreasing values of grid current to adjust said first and second tuning elements for further tuning said amplifier to said predetermined channel, and means responsive to shifting of said transmitter from one channel to said predetermined channel for placing said first and second means in operative condition.

5. Apparatus as defined in claim 4 wherein said tuning elements consist of variometers, said variometers being adjusted from a maximum to a minimum value when further tuning said amplifier.

6. In apparatus for tuning at least one stage of a radio transmitter to a selected carrier frequency, a differential relay including a control winding, a bias winding and an armature, means for energizing said bias winding with a first value of current during broad tuning of said stage to said selected frequency, means for energizing said bias winding with a plurality of sequentially decreasing values of current during further tuning of said stage to said selected frequency, means for selectively energizing said control winding during said broad and further tuning with a value of current dependent upon the magnitude of current flowing in said stage, said armature adapted to be actuated by said control winding during said broad tuning in response to a predetermined value of current flowing in said stage for terminating said broad tuning, said armature adapted to be actuated by said control winding during said further tuning in response to sequentially decreasing values of current flowing in said stage for terminating said further tuning.

7. Apparatus as defined in claim 6 wherein means are provided for reducing said bias current upon an initial actuation of said armature by said control winding.

8. Apparatus for tuning a power amplifier of a multichannel radio transmitter to a selected channel comprising a plurality of first and second networks adapted to broadly tune the grid and plate circuits, respectively, of the power amplifier when inserted therein, first and second tuning elements in the grid and plate circuits, respectively, of said amplifier for assisting in the broad and further tuning of said amplifier, a differential relay including a control winding, a bias winding and an armature, means for initiating broad tuning of said amplifier in response to the selection of said channel, means for energizing said bias winding with a first value of current during said broad tuning, means for selectively energizing said control winding with a value of current dependent upon the magnitude of grid current in said amplifier during said broad tuning, said armature adapted to be actuated by said control winding in response to a predetermined value of said grid current for terminating said broad tuning, means responsive to termination of said broad tuning for initiating further tuning of said amplifier, means for energizing said bias winding with sequentially decreasing values of current during said further tuning, means for selectively energizing said control winding with a value of current dependent upon the magnitude of grid current in said amplifier during said further tuning, said armature adapted to be actuated by said control winding in response to one of a plurality of values of said grid current corresponding to said sequentially decreasing values of current in said bias winding for terminating the tuning of said amplifier.

9. Apparatus as defined in claim 8 wherein means are provided for reducing said bias current upon an initial actuation of said armature by said control winding.

References Cited in the file of this patent

UNITED STATES PATENTS

| | | |
|---|---|---|
| 1,535,189 | Thompson | Apr. 28, 1925 |
| 1,842,781 | Halsey | Jan. 26, 1932 |
| 1,985,183 | McNeil | Dec. 18, 1934 |
| 2,101,668 | Bishop et al. | Dec. 7, 1937 |
| 2,173,902 | Gerth et al. | Sept. 26, 1939 |
| 2,270,917 | Appleton | Jan. 27, 1942 |
| 2,376,667 | Cunningham et al. | May 22, 1945 |
| 2,498,340 | Morrison | Feb. 21, 1950 |
| 2,505,511 | Vogel | Apr. 25, 1950 |
| 2,606,285 | Bataille et al. | Aug. 5, 1952 |